US009284901B2

(12) United States Patent
Dietl

(10) Patent No.: US 9,284,901 B2
(45) Date of Patent: Mar. 15, 2016

(54) METHOD AND DEVICE FOR OPERATING AN INTERNAL COMBUSTION ENGINE

(75) Inventor: Franz Dietl, Lappersdorf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1182 days.

(21) Appl. No.: 13/265,226

(22) PCT Filed: Mar. 30, 2010

(86) PCT No.: PCT/EP2010/054181
§ 371 (c)(1), (2), (4) Date: Oct. 19, 2011

(87) PCT Pub. No.: WO2010/121888
PCT Pub. Date: Oct. 28, 2010

(65) Prior Publication Data

US 2012/0037120 A1 Feb. 16, 2012

(30) Foreign Application Priority Data

Apr. 20, 2009 (DE) ........................ 10 2009 018 081

(51) Int. Cl.
*G06F 7/00* (2006.01)
*F02D 41/00* (2006.01)
(Continued)

(52) U.S. Cl.
CPC .......... *F02D 41/0097* (2013.01); *F02D 41/123* (2013.01); *F02D 41/1498* (2013.01); *F02N 11/106* (2013.01)

(58) Field of Classification Search
CPC F02D 41/0097; F02D 41/1498; F02D 41/123
USPC .................................. 123/333, 436; 701/104
See application file for complete search history.

(56) References Cited

U.S. PATENT DOCUMENTS 4,399,802 A * 8/1983 Oshiage et al. .......... 123/406.24
4,674,458 A * 6/1987 Mori ............................ 123/333
(Continued)

FOREIGN PATENT DOCUMENTS

EP 0382872 A1 8/1990 .............. F16F 15/12
EP 0655554 A1 5/1995 ............ B60W 30/18
(Continued)

OTHER PUBLICATIONS

International PCT Search Report, PCT/EP2010/054181, 13 pages, Mailed May 17, 2010.

*Primary Examiner* — Mahmoud Gimie
*Assistant Examiner* — David Hamaoui
(74) *Attorney, Agent, or Firm* — Slayden Grubert Beard PLLC

(57) ABSTRACT

In a method and a device for operating an internal combustion engine, with at least one cylinder (Z1-Z4) having a combustion chamber (26), fuel is injected into the cylinder and a logic value (LV_FCUT) is set, in particular for stopping the injection of fuel into the cylinder, The method furthermore has the following steps: depending on a course of the highly time-resolved measurement signal of a rotational speed (N_FAST) of the internal combustion engine, a local maximum value (N_FAST_MAX) of the rotational speed is determined, a rotational speed difference (N_FAST_DIF) between the local maximum value (N_FAST_MAX) and a current measured value (N_FAST_MES) of the rotational speed is determined, and, depending on the determined rotational speed difference (N_FAST_DIF), the logic value (LV_FCUT) is set.

15 Claims, 3 Drawing Sheets

(51) Int. Cl.
*F02D 41/12* (2006.01)
*F02D 41/14* (2006.01)
*F02N 11/10* (2006.01)

(56) References Cited

U.S. PATENT DOCUMENTS

| | | | | | |
|---|---|---|---|---|---|
| 5,383,820 | A * | 1/1995 | Mori | ............................. | 475/123 |
| 7,599,783 | B2 * | 10/2009 | Nakane | ......................... | 701/104 |
| 2002/0056440 | A1 | 5/2002 | Nagata et al. | ................. | 123/436 |
| 2003/0100975 | A1 * | 5/2003 | Hashimoto et al. | ............... | 701/1 |

FOREIGN PATENT DOCUMENTS

| | | | | | |
|---|---|---|---|---|---|
| EP | 0831225 | A2 | 3/1998 | .............. | F02D 41/38 |
| JP | 59085443 | A | 5/1984 | .............. | F02D 41/14 |

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2010/054181 filed Mar. 30, 2010, which designates the United States of America, and claims priority to German Application No. 10 2009 018 081.8 filed Apr. 20, 2009, the contents of which are hereby incorporated by reference in their entirety.

TECHNICAL FIELD

The invention relates to a method and a device for operating an internal combustion engine.

BACKGROUND

The technical book “Handbuch Verbrennungsmotor” [“Internal combustion engine handbook”], edited by Richard von Basshuysen, Fred Schäfer, 2nd edition, Vieweg & Sohn Verlagsgesellschaft mbH, June 2002, pages 79 to 80, discloses a dual-mass flywheel which has a first centrifugal mass rigidly coupled to the crankshaft of the internal combustion engine, and a second flywheel mass coupled to the transmission via a clutch. The first flywheel mass and the second flywheel mass are coupled to one another in a rotationally elastic manner by means of springs. Here, firstly the non-uniformities resulting from imbalances of the moving masses in the drivetrain and secondly the rotational non-uniformities resulting from the movements of the pistons of the internal combustion engine can be damped by means of the springs. Good vibrational characteristics of the drivetrain and therefore a high level of driving comfort can thereby be achieved.

The dual-mass flywheel may be described as a spring-mass system. It has a natural frequency dependent on the spring constants, on the masses of the first and second centrifugal masses and on the friction values.

At certain rotational speeds of the internal combustion engine, resonances may arise which may have repercussions on the running smoothness. The resonant frequency generally lies below the idle rotational speed. During starting and stopping of the internal combustion engine, said range is normally passed through so quickly that said resonances do not arise. Operation within said rotational speed range with resonance of the dual-mass flywheel may however occur if for example the starter is disengaged too early during starting, or if, during operation, the internal combustion engine is forced below its idle rotational speed with the clutch. Secondly, operation within said rotational speed range may occur without resonance arising, for example during starting of the internal combustion engine at very low temperatures.

In the event that resonance arises, suitable intervention into the control of the internal combustion engine should take place in order to prevent damage to the dual-mass flywheel. Said interventions should substantially reduce the torque of the internal combustion engine, for example by shutting off the injection. In the event that the internal combustion engine is running in the corresponding rotational speed range without resonance arising, however, a reduction in torque or even shut-off of the injection must not take place because otherwise, for example, a start of the internal combustion engine at low temperatures would not be possible.

SUMMARY

According to various embodiments, a method and a device for operating an internal combustion engine can be provided, by means of which it can be unequivocally detected whether resonance arises, and suitable intervention into the control takes place only in the event of resonance.

According to an embodiment, in a method for operating an internal combustion engine which has at least one cylinder with a combustion chamber, fuel is injected into the cylinder, wherein a logic value in particular for shutting off the injection of fuel into the cylinder is set by means of the method, having the steps:

as a function of a profile of a temporally highly resolved measurement signal of a rotational speed of the internal combustion engine, a local maximum value of the rotational speed is determined, a rotational speed difference between the local maximum value and a present measurement value of the rotational speed is determined, and the logic value is set as a function of the determined rotational speed difference.

According to a further embodiment, a counter value can be incremented when the rotational speed difference is greater than or equal to a predefined threshold value of the rotational speed difference, and the logic value can be set when the counter value is greater than or equal to a predefined threshold value of the counter. According to a further embodiment, the measurement signal of the rotational speed of the internal combustion engine can be detected with a temporal resolution of approximately 10 milliseconds.

According to another embodiment, a device for operating an internal combustion engine which has at least one cylinder with a combustion chamber which is designed for the injection of fuel into the cylinder, wherein the device is designed to set a logic value in particular for shutting off the injection of fuel into the cylinder, to determine a local maximum value of the rotational speed as a function of a profile of a temporally highly resolved measurement signal of a rotational speed of the internal combustion engine, to determine a rotational speed difference between the local maximum value and a present measurement value of the rotational speed, and the logic value is set as a function of the determined rotational speed difference.

BRIEF DESCRIPTION OF THE DRAWINGS

Exemplary embodiments will be explained in more detail below on the basis of the schematic drawings, in which.

Elements of identical design or function are denoted by the same reference numerals throughout the figures.

DETAILED DESCRIPTION

Figure 1:
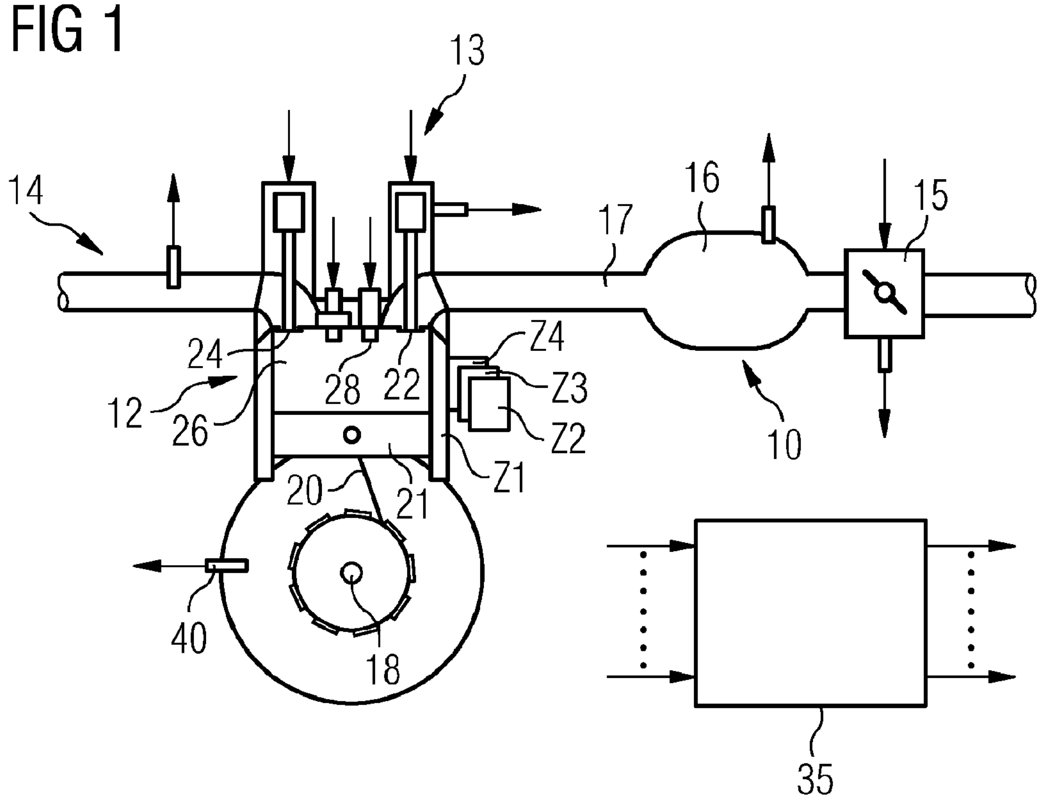
FIG. 1 shows an internal combustion engine with a control device.

Thus, as stated above, according to various embodiments, a method and a corresponding device for operating an internal combustion engine which has at least one cylinder with a combustion chamber, wherein fuel is injected into the cylinder, wherein a logic value in particular for shutting off the injection of fuel into the cylinder is set, having the steps: as a function of a profile of a temporally highly resolved measurement signal of a rotational speed of the internal combustion engine, a rotational speed difference between the local maximum value and a present measurement value of the rotational speed is determined, and the logic value is set as a function of the determined rotational speed difference.

The logic value in particular for shutting off the injection of fuel into the cylinder serves generally for the control of the internal combustion engine, in that by setting the logic value, a measure is initiated by means of which that state of the internal combustion engine is induced in which the rotational speed difference between the local maximum value and the present measurement value of the rotational speed assumes a value which leads to the setting of the logic value. The logic value is preferably also configured as a logic value for a reduction of the torque of the internal combustion engine, wherein the reduction of the torque of the internal combustion engine is in particular the shutting-off of the injection of fuel into the cylinder.

This has the advantage that the internal combustion engine can be shut down when it is detected that natural vibrations of a dual-mass flywheel coupled to the internal combustion engine arise. Only the profile of the measurement signal of the rotational speed of the internal combustion engine in a temporally highly resolved form is required to detect the possible natural vibrations. Aside from the rotational speed measurement, no further measurement of variables is required in order to detect the natural vibrations. Very reliable detection of the natural vibrations is therefore possible.

According to one embodiment, a counter value is incremented when the rotational speed difference is greater than or equal to a predefined threshold value of the rotational speed difference. The logic value is set when the counter value is greater than or equal to a predefined threshold value of the counter.

This has the advantage that the number of variations of the rotational speed which with regard to their size can contribute to the natural vibrations of the dual mass flywheel can be predefined.

According to a further embodiment, the measurement signal of the rotational speed of the internal combustion engine is detected with a temporal resolution of approximately 10 milliseconds.

This has the advantage that, with such a sampling rate, variations of the rotational speed of the internal combustion engine such are required for detecting natural vibrations of the dual mass flywheel can be determined in an effective manner.

FIG. 1 shows an internal combustion engine having an intake tract 10, an engine block 12, a cylinder head 13 and an exhaust tract 14. The intake tract 10 preferably comprises a throttle flap 15, a collector 16 and an intake pipe 17. The intake pipe 17 is guided to a cylinder Z1 at the inlet duct into a combustion chamber 26 of the engine block 12. The engine block 12 comprises a crankshaft 18 which is coupled via a connecting rod 20 to a piston 21 of the cylinder Z1.

The cylinder head 13 comprises a valve drive having a gas inlet valve 22 and a gas outlet valve 24. The cylinder head 13 also comprises an injection valve 28. The injection valve 28 may alternatively also be arranged in the intake pipe 17.

The internal combustion engine also has a control device 35, having sensors which detect different measurement variables and which can in each case determine the value of the measurement variables. As a function of at least one of the measurement variables, the control device 35 determines actuating variables which can then be converted into one or more actuating signals for controlling actuating elements by means of corresponding actuating drives. The control device 35 may also be referred to as a device for operating the internal combustion engine. The actuating elements are for example the throttle flap 15, the gas inlet and gas outlet valves 22, 24 or the injection valve 28.

The sensors comprise a crankshaft angle sensor 40, which detects a crankshaft angle to which a rotational speed of the internal combustion engine can be assigned.

Aside from the cylinder Z1, further cylinders Z2 to Z4 are preferably also provided, to which are likewise assigned corresponding actuating elements and, if appropriate, sensors. The internal combustion engine may therefore comprise any desired number of cylinders.

Figure 2:
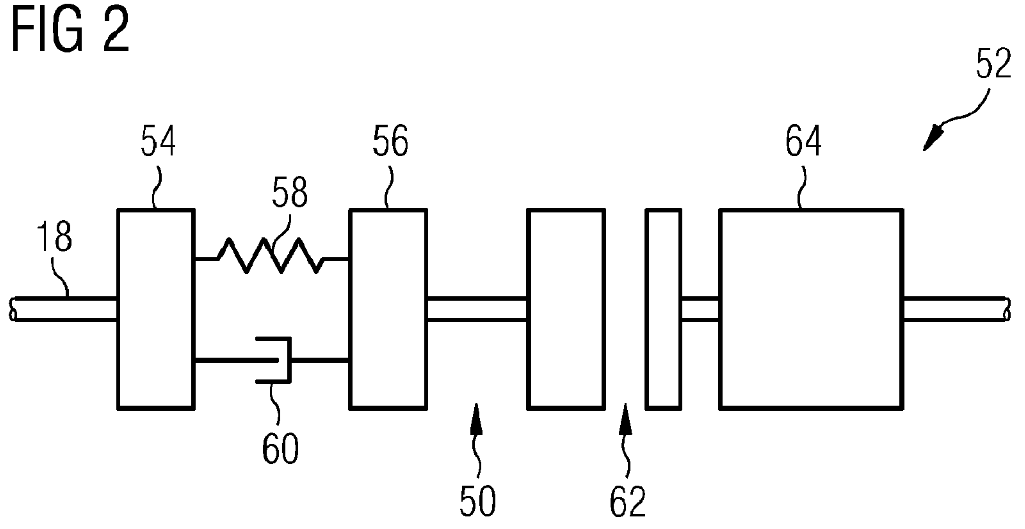
FIG. 2 shows a block circuit diagram of a drivetrain.

FIG. 2 shows a block circuit diagram of a drivetrain 50 having the crankshaft 18 which is coupled to a dual-mass flywheel 52. The dual-mass flywheel 52 has a first centrifugal mass 54 and a second centrifugal mass 56. The first centrifugal mass 54 and the second centrifugal mass 56 are coupled to one another by means of elastic elements 58 and/or damping elements 60. The drivetrain 50 has a clutch 62 and a transmission 64 which is coupled to drive wheels of the motor vehicle. The dual-mass flywheel 52 acts as a mechanical low-pass filter by means of which in particular a transmission of non-uniformities of the rotation of the crankshaft 18 to the transmission 64 can be prevented.

For the operation of the internal combustion engine, a program may be stored in a program memory of the control device 35 and executed during the operation of the internal combustion engine. Measures for reducing the torque of the internal combustion engine may be implemented by means of the program. In particular, the supply of fuel via the injection valve 28 into the cylinder, for example into the combustion chamber 26, may be prevented.

Figure 3:
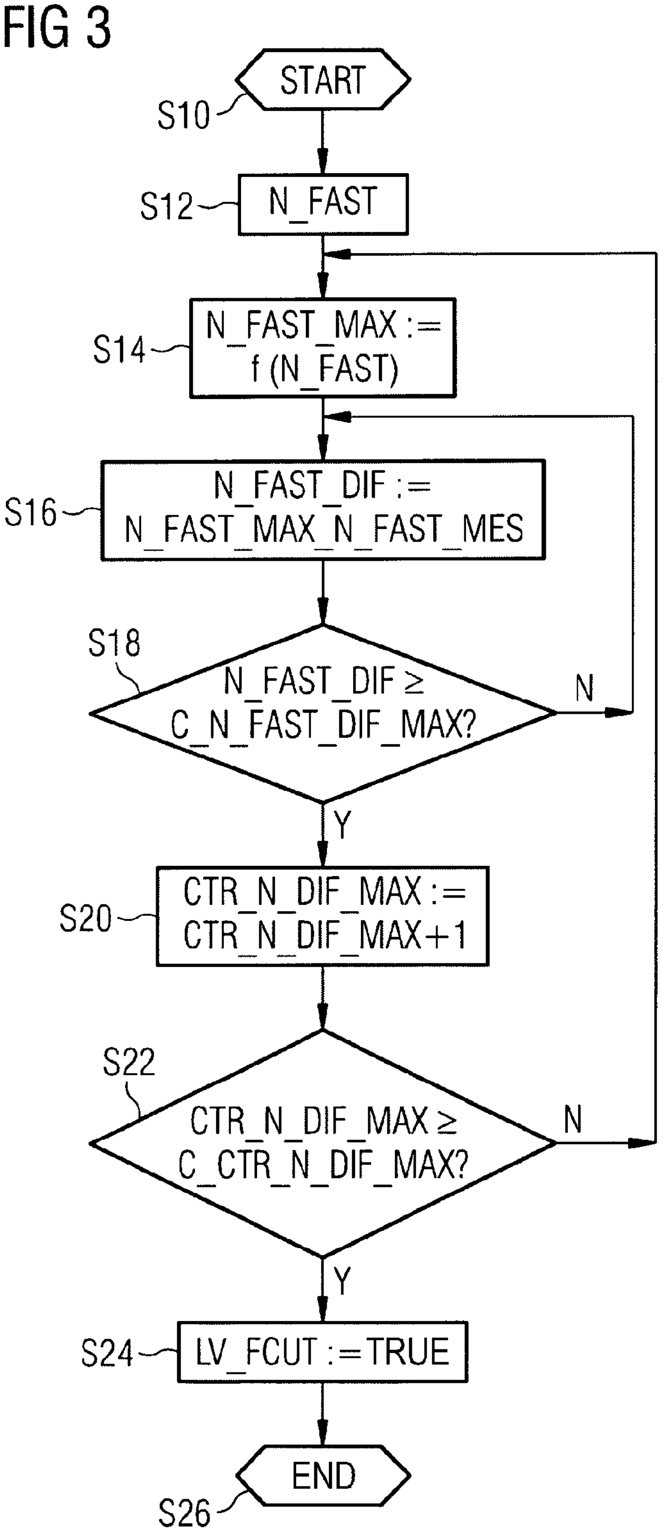
FIG. 3 shows a flow diagram of a program which is processed in the control device.

A program for the execution of the method for operating the internal combustion engine is shown in FIG. 3.

In a step S10, preferably temporally close to the start of the operation of the motor vehicle, the program is started and, if appropriate, variables are initialized. The start preferably takes place upon the beginning of the operation of the internal combustion engine.

In a step S12, a rotational speed N_FAST of the internal combustion engine is detected by means of a temporally highly resolved measurement, preferably with a sampling rate of 10 milliseconds.

In a step S14, a local maximum value N_FAST_MAX of the rotational speed of the internal combustion engine is determined from the determined profile of the rotational speed N_FAST of the internal combustion engine. The local maximum value N_FAST_MAX is in particular the most recent local maximum of the profile of the rotational speed N_FAST of the internal combustion engine.

In a step S16, a rotational speed difference N_FAST_DIF between the local maximum value N_FAST_MAX and a present measurement value N_FAST_MES of the rotational speed is determined.

In a step S18, it is checked whether the rotational speed difference N_FAST_DIF is greater than or equal to a predefined threshold value C_N_FAST_DIF_MAX of the rotational speed difference. If it is detected in step S18 that the rotational speed difference N_FAST_DIF is less than the predefined threshold value C_N_FAST_DIF_MAX of the rotational speed difference, the program continues in step S16. If the rotational speed difference N_FAST_DIF is greater than or equal to the threshold value C_N_FAST_DIF-_MAX of the rotational speed difference, the program continues in a further step S20.

In the step S20, a counter value CTR_N_DIF_MAX is incremented.

In a further step S22, it is checked whether the counter value CTR_N_DIF_MAX is greater than or equal to a predefined threshold value C_CTR_N_DIF_MAX of the counter. If this is not the case, the program continues in step S14. If the counter value CTR_N_DIF_MAX is greater than or equal to the predefined threshold value C_CTR_N_DIF_MAX of the counter, the program is continued in the step S24.

In the step S24, a logic value LV_FCUT is set to a logic value TRUE. The setting of the logic value LV_FCUT to TRUE is linked to the initiation of a measure by means of which that state of the internal combustion engine is induced in which the rotational speed difference N_FAST_DIF assumes a value which leads to the setting of the logic value LV_FCUT. Preferably, for this purpose, a measure is initiated in order to reduce the torque of the internal combustion engine. In particular, the supply of fuel via the injection valve 28 into the cylinders is prevented.

In a step S26, the program for operating the internal combustion engine ends.

Figure 4:
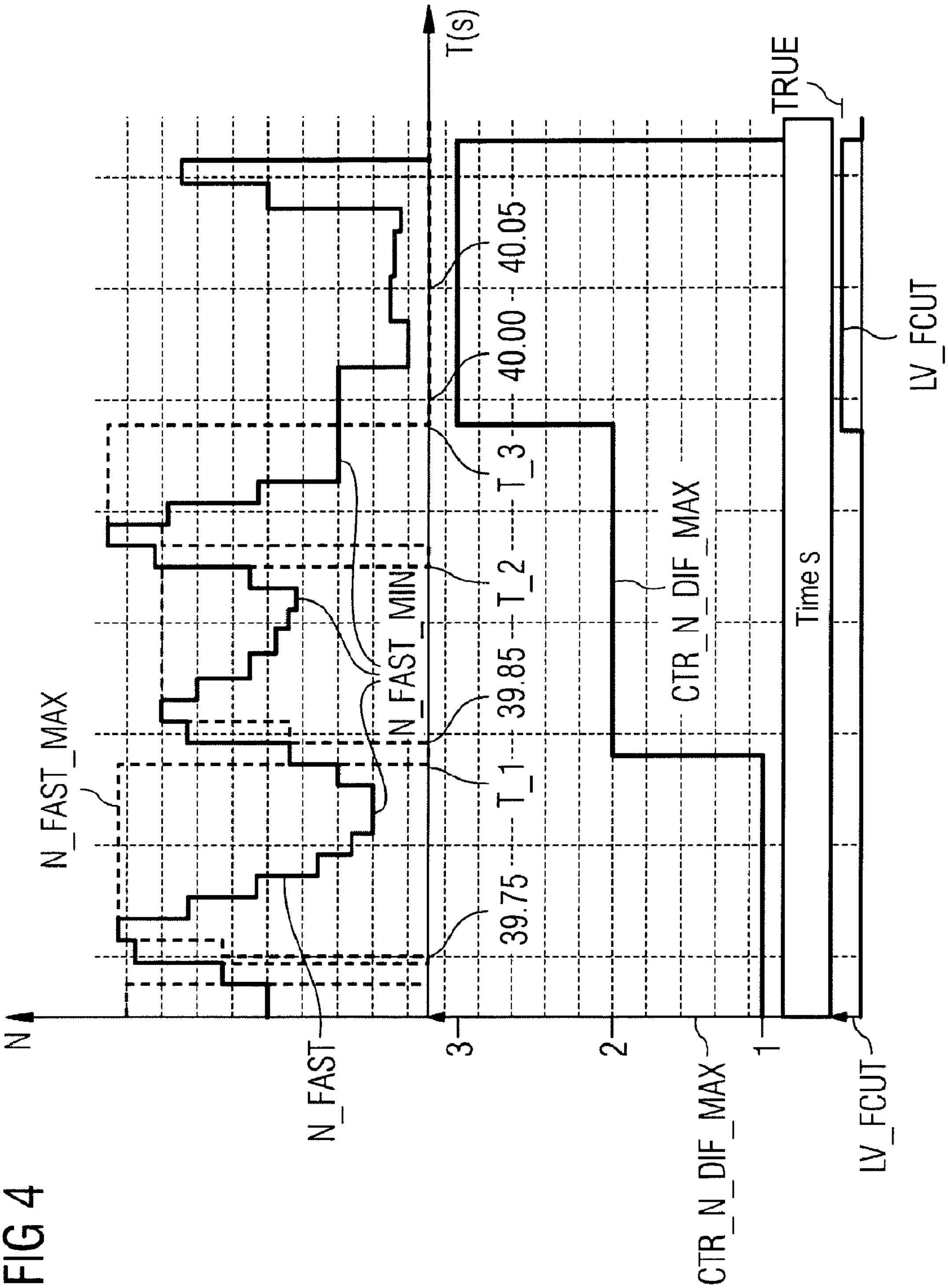
FIG. 4 shows time profiles of signals of the internal combustion engine.

FIG. 4 shows profiles of a temporally highly resolved measurement signal of the rotational speed N_FAST of the internal combustion engine, of the local maximum value N_FAST_MAX of the rotational speed, of the counter value CTR_N_DIF_MAX and of the logic value LV_FCUT.

The measurement signal of the rotational speed N_FAST of the internal combustion engine is preferably detected with a temporal resolution of approximately 10 milliseconds, as can be seen from the values plotted by way of example on the time axis T. At a resolution of 10 milliseconds, dynamics of the rotational speed N_FAST of the internal combustion engine, such as are significant for the occurrence of natural vibrations of the dual mass flywheel 52, can be particularly clearly identified.

The signal of the local maximum value N_FAST_MAX of the rotational speed is configured correspondingly to a maximum indicator, wherein when a local maximum of the rotational speed N_FAST of the internal combustion engine is reached, the maximum indicator is set to the value of the attained local maximum value N_FAST_MAX of the rotational speed. During a decrease in the temporally highly resolved measurement signal of the rotational speed N_FAST, the maximum indicator remains at the value of the attained local maximum value N_FAST_MAX of the rotational speed until a local minimum N_FAST_MIN of the rotational speed of the internal combustion engine is reached. The maximum indicator is then set to zero.

If the rotational speed difference N_FAST_DIF between the local maximum value N_FAST_MAX and the attained local minimum N_FAST_MIN of the rotational speed of the internal combustion engine is greater than or equal to the predefined threshold value C_N_FAST_DIF_MAX of the rotational speed difference, the counter value CTR_N_DIF_MAX is incremented (times T_1 and T_3 in FIG. 4).

If the rotational speed difference N_FAST_DIF between the local maximum value N_FAST_MAX and the attained local minimum N_FAST_MIN of the rotational speed of the internal combustion engine is less than the predefined threshold value C_N_FAST_DIF_MAX of the rotational speed difference. The counter value CTR_N_DIF_MAX remains unchanged (time T_2 in FIG. 4).

If the counter value CTR_N_DIF_MAX reaches a value which is greater than or equal to the predefined threshold value C_CTR_N_DIF_MAX of the counter (in the example of FIG. 4, said threshold value C_CTR_N_DIF_MAX is equal to three), the logic value LV_FCUT for shutting off the injection of fuel into the cylinders is set to the logic value TRUE (time T_3 in FIG. 4).

By means of said method, that state of the internal combustion engine can be induced in which an excitation of natural vibrations of the dual-mass flywheel 52 which is coupled to the internal combustion engine via the crankshaft 18 can arise. In particular, the injection of fuel into the cylinders of the internal combustion engine can be reduced or stopped when it is detected that the temporally highly resolved measurement signal of the rotational speed N_FAST of the internal combustion engine exhibits dynamics known to be capable of leading to natural resonance of the dual-mass flywheel 52.

It can be seen as particularly advantageous that the prevention of the possible excitation of natural vibrations of the dual-mass flywheel 52 requires merely the knowledge of the profile of the measurement signal of the rotational speed N_FAST of the internal combustion engine in the temporally highly resolved form. No further measurement variables need be determined in order to be able to make a distinction between the situation of an excitation of natural vibrations of the dual-mass flywheel 52 and an operating situation without such excitation. Therefore, in particular during a start of the internal combustion engine at low outside temperatures, it is possible by means of the described method both to prevent an unnecessary shutting-off of the injection of fuel into the cylinders of the internal combustion engine and also to obtain a reliable detection of the excitation of natural vibrations of the dual-mass flywheel 52, because by means of the described method, the running characteristics of the internal combustion engine are determined directly and are not merely reproduced approximately by means of further measurement variables and a model. Correspondingly, a reliable detection of the excitation of natural vibrations of the dual-mass flywheel 52 can be obtained in the event of erroneous clutch operation by the driver.

Overall, therefore, it is made possible to identify the possible excitation of natural vibrations of the dual-mass flywheel 52 in a highly reliable manner and to prevent misinterpretation of the measurement results of other signal transmitters.

The invention claimed is:

1. A method for operating an internal combustion engine having at least one cylinder with a combustion chamber into which fuel is injected, the method comprising:

determining a local maximum value of a rotational speed of the internal combustion engine as a function of a profile of a temporally highly resolved measurement signal of the rotational speed of the internal combustion engine, determining a rotational speed difference between the local maximum value and a present measurement value of the rotational speed incrementing a counter value when the rotational speed difference is greater than or equal to a predefined threshold value of the rotational speed difference, comparing the incremented counter value to a predefined threshold value of the counter, the predefined threshold value of the counter being greater than one, and in response to determining that the counter value is greater than or equal to the predefined threshold value of the counter, controlling the internal combustion engine to reduce a torque of the internal combustion engine.

2. The method according to claim 1, wherein the measurement signal of the rotational speed of the internal combustion engine is detected with a temporal resolution of approximately 10 milliseconds.

3. The method according to claim 1, wherein controlling the internal combustion engine to reduce a torque of the internal combustion engine comprises preventing fuel injection into the at least one cylinder.

4. The method according to claim 1, wherein determining the rotational speed difference between the local maximum value and the present measurement value of the rotational speed comprises determining the rotational speed difference between the local maximum value and a local minimum value of the rotational speed.

5. The method according to claim 1, wherein controlling the internal combustion engine to reduce a torque of the internal combustion engine comprises reducing fuel injection into the at least one cylinder.

6. A device for operating an internal combustion engine which has at least one cylinder with a combustion chamber into which fuel is injected, wherein the device is configured to:

determine a local maximum value of a rotational speed of the internal combustion engine as a function of a profile of a temporally highly resolved measurement signal of the rotational speed of the internal combustion engine, determine a rotational speed difference between the local maximum value and a present measurement value of the rotational speed, increment a counter value when the rotational speed difference is greater than or equal to a predefined threshold value of the rotational speed difference, compare the incremented counter value to a predefined threshold value of the counter, the predefined threshold value of the counter being greater than one, and in response to determining that the counter value is greater than or equal to the predefined threshold value of the counter, control the internal combustion engine to reduce a torque of the internal combustion engine.

7. The device according to claim 6, wherein the device is configured to detect the measurement signal of the rotational speed of the internal combustion engine with a temporal resolution of approximately 10 milliseconds.

8. The device according to claim 6, wherein controlling the internal combustion engine to reduce a torque of the internal combustion engine comprises preventing fuel injection into the at least one cylinder.

9. The device according to claim 6, wherein controlling the internal combustion engine to reduce a torque of the internal combustion engine comprises reducing fuel injection into the at least one cylinder.

10. The device according to claim 6, wherein determining the rotational speed difference between the local maximum value and the present measurement value of the rotational speed comprises determining the rotational speed difference between the local maximum value and a local minimum value of the rotational speed.

11. An internal combustion engine, comprising:

at least one cylinder, each having a combustion chamber into which fuel is injected; and a control unit configured to:

determine a local maximum value of a rotational speed of the internal combustion engine as a function of a profile of a temporally highly resolved measurement signal of the rotational speed of the internal combustion engine, determine a rotational speed difference between the local maximum value and a present measurement value of the rotational speed, increment a counter value when the rotational speed difference is greater than or equal to a predefined threshold value of the rotational speed difference, compare the incremented counter value to a predefined threshold value of the counter, the predefined threshold value of the counter being greater than one, and in response to determining that the counter value is greater than or equal to the predefined threshold value of the counter, control the internal combustion engine to reduce a torque of the internal combustion engine.

12. The internal combustion engine according to claim 11, wherein the control unit is configured to detect the measurement signal of the rotational speed of the internal combustion engine with a temporal resolution of approximately 10 milliseconds.

13. The internal combustion engine according to claim 11, wherein controlling the internal combustion engine to reduce a torque of the internal combustion engine comprises preventing fuel injection into the at least one cylinder.

14. The internal combustion engine according to claim 11, wherein controlling the internal combustion engine to reduce a torque of the internal combustion engine comprises reducing fuel injection into the at least one cylinder.

15. The internal combustion engine according to claim 11, wherein determining the rotational speed difference between the local maximum value and the present measurement value of the rotational speed comprises determining the rotational speed difference between the local maximum value and a local minimum value of the rotational speed.

* * * * *